(12) United States Patent
Kawamura

(10) Patent No.: US 11,606,943 B2
(45) Date of Patent: Mar. 21, 2023

(54) GRIP HAVING IMPROVED NIBBLE CONDUCTIVITY AND FISHING ROD HAVING THE GRIP

(71) Applicant: Globeride, Inc., Tokyo (JP)

(72) Inventor: Takuji Kawamura, Tokyo (JP)

(73) Assignee: GLOBERIDE, Inc., Tokyo (JP)

(*) Notice: Subject to any disclaimer, the term of this patent is extended or adjusted under 35 U.S.C. 154(b) by 139 days.

(21) Appl. No.: 15/439,000

(22) Filed: Feb. 22, 2017

(65) Prior Publication Data

US 2017/0280695 A1    Oct. 5, 2017

(30) Foreign Application Priority Data

Mar. 31, 2016 (JP) ............................. JP2016-070622

(51) Int. Cl.
*A01K 87/08*   (2006.01)

(52) U.S. Cl.
CPC .................................... *A01K 87/08* (2013.01)

(58) Field of Classification Search
CPC ........ A01K 87/08; A01K 87/00; A63B 60/00; A63B 60/54; A63B 53/14; A63B 60/14; A63B 60/06; A63B 60/10
USPC ................................................ 43/23, 18.1 R
See application file for complete search history.

(56) References Cited

U.S. PATENT DOCUMENTS

| | | | | |
|---|---|---|---|---|
| 3,466,783 A | * | 9/1969 | Priebe, Jr. ............... | A01K 87/00 43/18.5 |
| 5,792,551 A | * | 8/1998 | Miyao .................... | A63B 49/08 428/304.4 |
| 6,148,558 A | * | 11/2000 | Ono ........................ | A01K 87/00 43/18.1 R |

FOREIGN PATENT DOCUMENTS

| | | |
|---|---|---|
| CN | 1809272 A | 7/2006 |
| CN | 1853463 A | 11/2006 |
| CN | 101411322 A | 4/2009 |
| JP | 02-003259 U1 | 1/1990 |
| JP | 09-107851 A | 4/1997 |
| JP | 2001-37376 | 2/2001 |
| JP | 3462572 B2 | 11/2003 |
| JP | 2008-017791 A | 1/2008 |
| JP | 2008-187942 A | 8/2008 |
| JP | 2011-24491 | 2/2011 |
| JP | 2015-133936 A | 7/2015 |

OTHER PUBLICATIONS

Extended European Search Report EP Application No. 17157798.4 dated Aug. 30, 2017.

(Continued)

*Primary Examiner* — Peter M Poon
*Assistant Examiner* — Jeffrey R Larsen
(74) *Attorney, Agent, or Firm* — K&L Gates LLP

(57) ABSTRACT

One object is to provide a grip having an improved nibble conductivity and a fishing rod having the grip. A grip according to an embodiment of the present invention is, e.g., a grip for a fishing rod. This grip includes a core layer externally mounted on a rod element, and a fiber-reinforced resin layer that covers the outer surface of the core layer. In an embodiment of the present invention, the fiber-reinforced resin layer contacts with an outer surface of the rod element. In an embodiment, the fiber-reinforced resin layer has a smaller damping ratio than the core layer.

12 Claims, 4 Drawing Sheets

(56) References Cited

OTHER PUBLICATIONS

Notification of Reasons for Refusal dated Dec. 18, 2018 issued in corresponding Japanese Patent Application No. 2016-070622 with English translation.
The First Office Action dated Feb. 28, 2020, of counterpart Chinese Application No. 201710194866.4, along with an English translation.

* cited by examiner

GRIP HAVING IMPROVED NIBBLE CONDUCTIVITY AND FISHING ROD HAVING THE GRIP

CROSS-REFERENCE TO RELATED APPLICATIONS

This application is based on and claims the benefit of priority from Japanese Patent Application Serial No. 2016-070622 (filed on Mar. 31, 2016), the contents of which are hereby incorporated by reference in their entirety.

TECHNICAL FIELD

The present invention relates to a grip having an improved nibble conductivity and a fishing rod having the grip.

BACKGROUND

Conventional grips used on a fishing rod may include a soft material such as a natural cork in the surface thereof, thereby to achieve weight reduction and comfortable grip feeling. Fishing rods having such a grip are disclosed in, e.g., Japanese Patent Application Publication No. 2001-37376 and Japanese Patent Application Publication No. 2011-24491 (the "'491 Publication"). The fishing rod disclosed in the '491 Publication includes a grip base made of a fiber-reinforced resin provided around a rod tube, and a surface layer on the grip base made of a material (such as cork) softer than the grip base. The '491 Publication describes the grip as having a good grip feeling on the surface layer thereof and increasing the nibble sensitivity.

When the surface layer of the grip is formed of a soft material such as cork, the vibration conducted from the fishing rod may be damped largely in the surface layer. Accordingly, the conventional grip fails to provide good nibble conductivity to the angle's hand.

SUMMARY

One object of the present invention is to provide a grip having an improved nibble conductivity and a fishing rod having the lightweight grip. The other objects of the present disclosure will be apparent with reference to the entire description in this specification.

The grip according to an embodiment of the present invention is, e.g., a grip for a fishing rod. This grip includes a core layer externally mounted on a rod element, and a fiber-reinforced resin layer that covers the outer surface of the core layer. In an embodiment of the present invention, the fiber-reinforced resin layer contacts with an outer surface of the rod element.

In this embodiment, the vibration in the rod element caused by a nibble is conducted via the fiber-reinforced resin layer to the angler. Thus, the grip provides an improved nibble conductivity.

In the grip according to an embodiment of the present invention, a part of the fiber-reinforced resin layer is positioned between the rod element and the core layer. According to this embodiment, the rod element and the fiber-reinforced resin layer contact with each other in a large area, and therefore, more of the vibration in the rod element can be conducted to the fiber-reinforced resin layer. Further, even when the core layer is made of a soft material (a cork, a resin foam, or the like), the grip is less prone to yield.

In the grip according to an embodiment of the present invention, a part of the fiber-reinforced resin layer covers a front end or a rear end of the core layer. According to this embodiment, the core layer can be prevented from being exposed.

In the grip according to an embodiment of the present invention, the fiber-reinforced resin layer includes reinforcement fibers arranged along an axial direction of the rod element. In general, reinforcement fibers have a smaller damping ratio than a matrix resin. Therefore, according to this embodiment, the vibration from the rod element is conducted through the reinforcement fibers in the fiber-reinforcement resin layer under a smaller damping effect. Thus, the nibble conductivity can be further improved.

A fishing rod according to an embodiment of the present invention includes a grip to be gripped by an angler. This grip includes a core layer externally mounted on the outer surface of a rod element, and a fiber-reinforced resin layer that covers the outer surface of the core layer. The fiber-reinforced resin layer contacts the outer surface of the rod element.

ADVANTAGES

Embodiments of the present invention provide a grip having an improved nibble conductivity and a fishing rod having the grip.

DESCRIPTION OF EXAMPLE EMBODIMENTS

Figure 1:
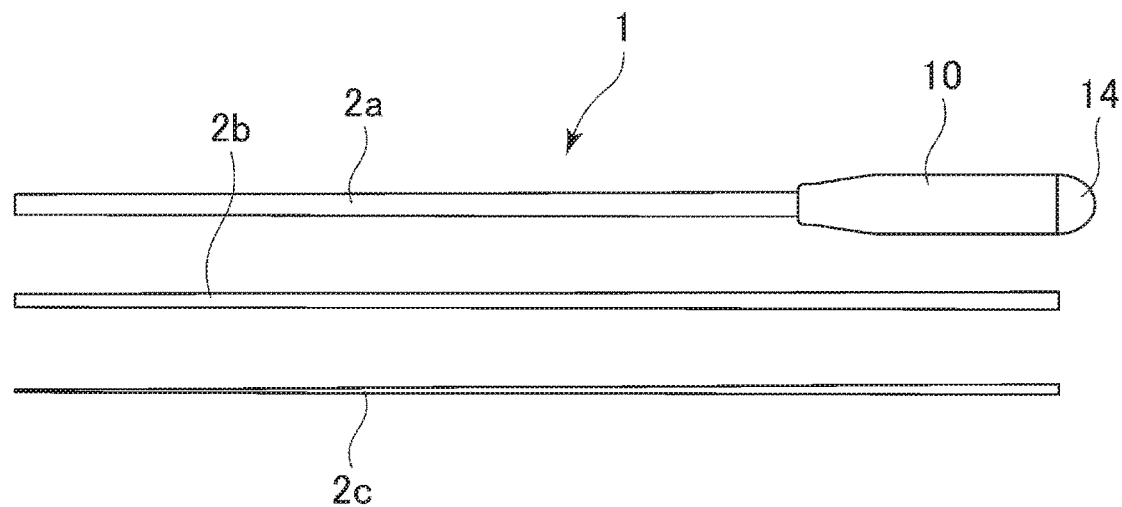
FIG. 1 illustrates a fishing rod according to an embodiment of the present invention.

Various embodiments of the invention will be described hereinafter with reference to the drawings. In the drawings, the same components are denoted by the same reference numerals. It should be noted that the drawings do not necessarily appear in accurate scales, for convenience of description.

Figure 2:
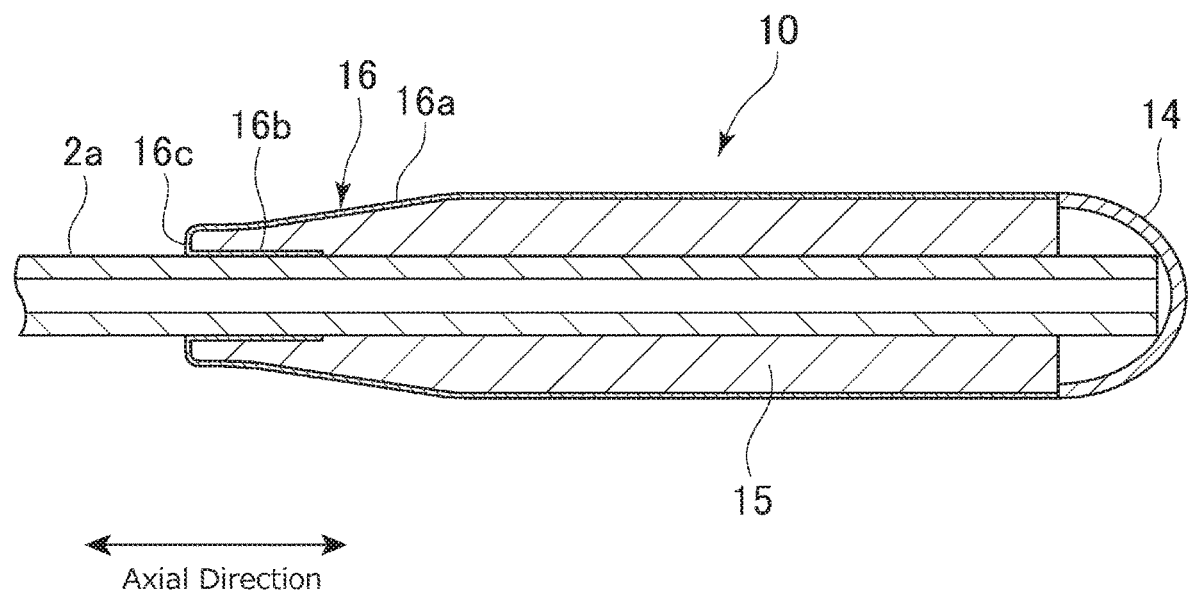
FIG. 2 is a sectional view of a grip provided on the fishing rod of FIG. 1.

FIGS. 1 and 2 illustrate a fishing rod 1 according to an embodiment of the present invention. FIG. 1 shows the entirety of the fishing rod 1. FIG. 2 is a sectional view of a grip provided on the fishing rod 1. FIG. 2 is a sectional view showing the grip that is cut along a plane extending through the central axis of a rod element.

The fishing rod 1 may be constituted by a plurality of rod elements. In the example shown in FIG. 1, the fishing rod 1 may include a rod element 2a, a rod element 2b, and a rod element 2c. The rod element 2a may be positioned most proximal of the rod elements. The rod element 2a may also be referred to as a base rod. The rod element 2a may be provided with a grip 10 to be gripped by an angler for fishing. On the butt end of the grip 10, there may be provided a butt plug 14. The rod element 2c may be positioned most distal of the rod elements. The rod element 2c may also be referred to as a tip rod. In use of the fishing rod 1 of FIG. 1, the proximal end of the rod element 2c may be inserted into the distal end of the rod element 2b, and the proximal end of the rod element 2b may be inserted into the distal end of the rod element 2a. One example of the fishing rod 1 may be a spatula rod.

As shown in FIG. 2, the rod element 2a may have a hollow tubular shape. Likewise, the rod elements 2b and 2c may also have a hollow tubular shape. The rod elements 2a, 2b, and 2c may be formed of, e.g., prepreg sheets including carbon fibers impregnated with a matrix resin. It may also be possible that the rod elements 2a, 2b, and 2c are solid.

The grip 10 may include a core layer 15 externally mounted on the rod element 2a, and a fiber-reinforced resin layer 16 covering the outer surface of the core layer 15. The core layer 15 may have a hollow shape so as to receive the rod element 2a. In an embodiment, the core layer 15 may be formed of a resin foam such as urethane foam, a natural cork, or other lightweight and soft materials. In general, resin foams are lightweight and soft. With the core layer 15 made of a resin foam, the grip 10 may be lightweight and provide a comfortable grip feeling. The materials of the core layer 15 are not limited to those explicitly disclosed herein. Various materials may be used for the core layer 15 in view of the weight, flexibility, working properties, costs, etc.

In an embodiment of the present invention, the fiber-reinforced resin layer 16 may be formed of a prepreg sheet including reinforcement fibers impregnated with a matrix resin. The reinforcement fibers used in the fiber-reinforced resin layer 16 may be, e.g., carbon fibers or glass fibers. The matrix resin may be constituted by various known synthetic resins.

The fiber-reinforced resin layer 16 may include a surface portion 16a that may cover the outer surface of the core layer 15, an interposition layer 16b positioned between the core layer 15 and the rod element 2a, and a connection portion 16c that may connect the surface portion 16a and the interposition layer 16b. The fiber-reinforced resin layer 16 may be provided so as to contact with the outer surface of the rod element 2a. In the example shown in FIG. 2, the fiber-reinforced resin layer 16 may contact with the rod element 2a at the interposition layer 16b. Thus, the vibration in the rod element 2a may be conducted via the interposition layer 16b to the surface portion 16a.

Since the fiber-reinforced resin layer 16 may include a large number of reinforcement fibers, the vibration conducted from the rod element 2a may be conducted through the reinforcement fibers to the surface portion 16a. The fiber-reinforced resin layer 16 may preferably have a smaller damping ratio than the core layer 15. A damping ratio is an index indicating a tendency to damp a vibration. A larger damping ratio leads to a higher tendency to damp a vibration, and a smaller damping ratio leads to a smaller tendency to damp a vibration. A damping ratio is determined based on a loss factor measured by Japanese Industrial Standard JIS G0602-1993 (the method of testing vibration damping characteristics of laminated damping steel sheets). In general, reinforcement fibers have a smaller loss factor than a matrix resin. Therefore, the vibration conducted from the rod element 2a may be conducted through the reinforcement fibers to the surface portion 16a under a smaller damping effect.

Thus, with the grip 10 according to an embodiment of the present invention, the vibration in the rod element 2a may be conducted through the fiber-reinforced resin layer 16 to the angler. Therefore, the vibration may be damped less in the grip 10 than in conventional grips in which vibration in the rod element is conducted through a resin foam to the angler. The grip 10 improves the nibble conductivity.

The fiber-reinforced resin layer 16 may include reinforcement fibers oriented along the axial direction of the rod element 2a. The fiber-reinforced resin layer 16 including reinforcement fibers oriented along the axial direction of the rod element 2a can conduct the vibration from the rod element 2a to the surface portion 16a with a smaller damping effect than a fiber-reinforced resin layer including reinforcement fibers oriented in other directions (e.g., the circumferential direction of the rod element 2a). Further, the fiber-reinforced resin layer 16 may include reinforcement fibers woven together (e.g., plain-woven together). The fiber-reinforced resin layer 16 including reinforcement fibers woven together may have less tendency to be removed at an end surface thereof, as compared to a fiber-reinforced resin including reinforcement fibers oriented in a particular direction. Further, since the reinforcement fibers woven together in the fiber-reinforced resin layer 16 can be moved easily, the fiber-reinforced resin layer 16 can be easily placed on a surface having a tapered shape or a complex shape.

In the grip 10 according to an embodiment of the present invention, the connection portion 16c may cover the front end of the core layer 15. This arrangement may prevent the core layer 15 from being exposed to the environment. Also, this arrangement may restrain wear and corrosion of the core layer 15. In addition, since the outer surface and the front end of the grip 10 are covered with the fiber-reinforced resin layer 16, a neat appearance can be obtained.

In the grip 10 according to an embodiment of the present invention, the deformation of the core layer 15 in the circumferential direction thereof may be restrained by the interposition layer 16b and the connection portion 16c. In other words, the distal end of the core layer 15 may be reinforced with the surface portion 16a, the interposition layer 16b, and the connection portion 16c made of the fiber-reinforced resin. More specifically, the connection portion 16c, which extends in the thickness direction of the core layer 15, can support the core layer 15 against a force imparted in such a direction as to internally compress the core layer 15. Thus, the grip 10 may be restrained from yielding, by the surface portion 16a, the interposition layer 16b, and the connection portion 16c.

Figure 3:
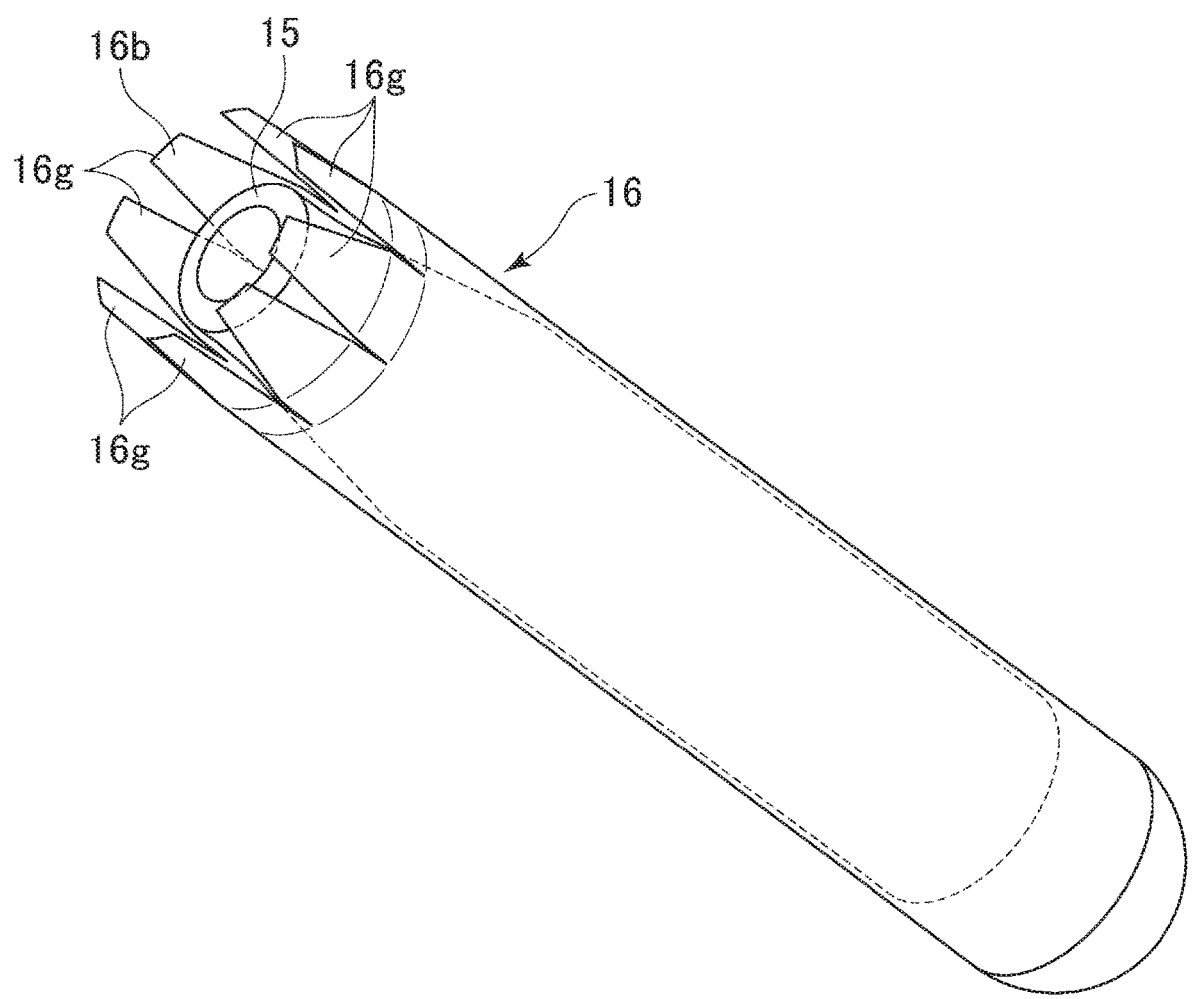
FIG. 3 schematically illustrates cuts formed in an end of a fiber-reinforced resin layer.

The fiber-reinforced resin layer 16 may be formed of a prepreg sheet. The prepreg sheet may be wound on the surface of the core layer 15 having a hollow tubular shape, and an end of the prepreg sheet may be folded axially inward. As shown in FIG. 3, at least one of the opposite ends of the prepreg sheet in the front-rear direction of the rod element 2a may have cuts formed therein. Since the end of the prepreg sheet has cuts formed therein, a plurality of foldable portions 16g may be provided in the end of the prepreg sheet. The foldable portions 16g may be formed by cutting short triangular pieces from the front and/or rear end of the prepreg sheet. The foldable portions 16g may be folded toward the inner circumferential surface of the core layer 15. The portions of the foldable portions 16g that may be positioned between the core layer 15 and the rod element 2a may constitute the interposition layer 16b, and the portions that may cover the front end surface of the core layer 15 may constitute the connection portion 16c. Each of the foldable portions 16g may be formed so as not to produce a gap with the inner circumferential surface of the core layer 15 when folded toward it. In addition, each of the foldable portions 16g may be formed so as not to overlap with each other when folded toward the inner circumferential surface of the core layer 15. The prepreg sheet having such cuts formed therein may be wound on the outer surface of the core layer 15, and the foldable portions 16g of the prepreg sheet may be folded, such that the end of the prepreg sheet (the portion corresponding to the interposition layer 16b) can be positioned on the inner surface of the core layer 15. When the reinforcement fibers included in the prepreg sheet are oriented along the axial direction of the rod element 2a, short triangular pieces may be cut from the axial end of the prepreg sheet, as described above. Thus, the orientation of the reinforcement fibers along the axial direction can be maintained even on the outer surface of the tapered front end of the core layer 15 when the prepreg sheet is wound on the surface of the core layer 15. With this arrangement, the prepreg sheet can be restrained from rising, and therefore, the prepreg sheet can be easily wound around the core layer. It may also be possible to form the foldable portions 16g by forming axially-extending slits in at least one of the front and rear ends of the prepreg sheet. These slits may prevent occurrence of wrinkles when the end of the prepreg sheet is folded toward the inner circumferential surface of the core layer 15. That is, the foldable portions 16g formed by the slits may overlap with each other on the surface of the tapered portion of the core layer 15. Thus, a plurality of foldable portions 16g may overlap with each other in the front and/or rear end of the grip, thereby increasing the strength of the front and/or rear end of the grip.

Between the core layer 15 and the fiber-reinforced resin layer 16, there may be provided an intermediate layer (not shown) formed of a synthetic resin. When the core layer 15 is formed of a resin foam, the matrix resin in the fiber-reinforced resin layer 16 may be adsorbed onto the core layer 15, so as to cause lack of resin in the fiber-reinforced resin layer 16. Between the core layer 15 and the fiber-reinforced resin layer 16, there may be provided an intermediate layer formed of a synthetic resin to prevent the lack of resin.

Figure 4:
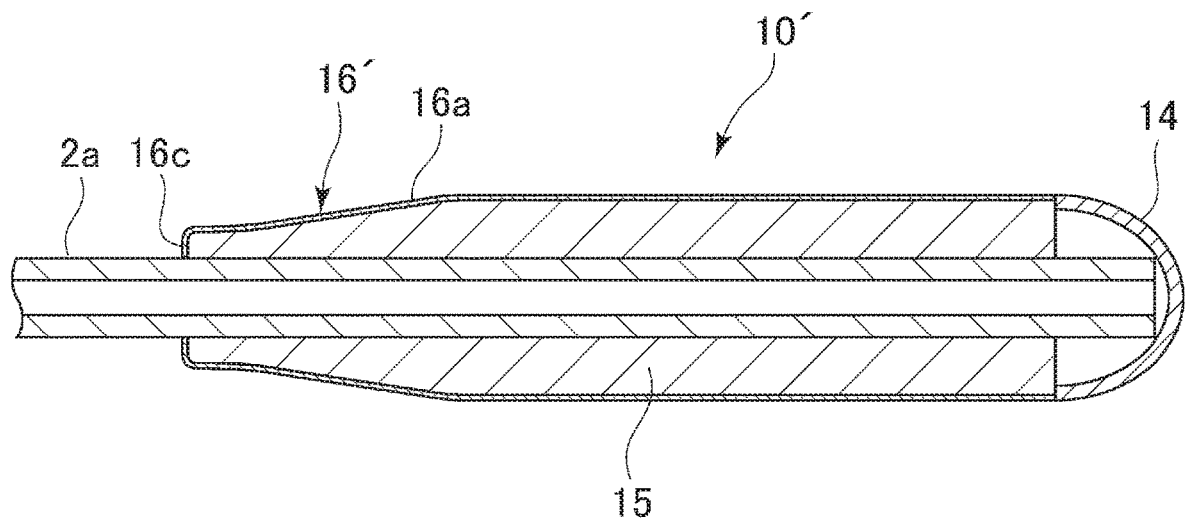
FIG. 4 is a sectional view of a grip according to an embodiment of the present invention.
Figure 5:
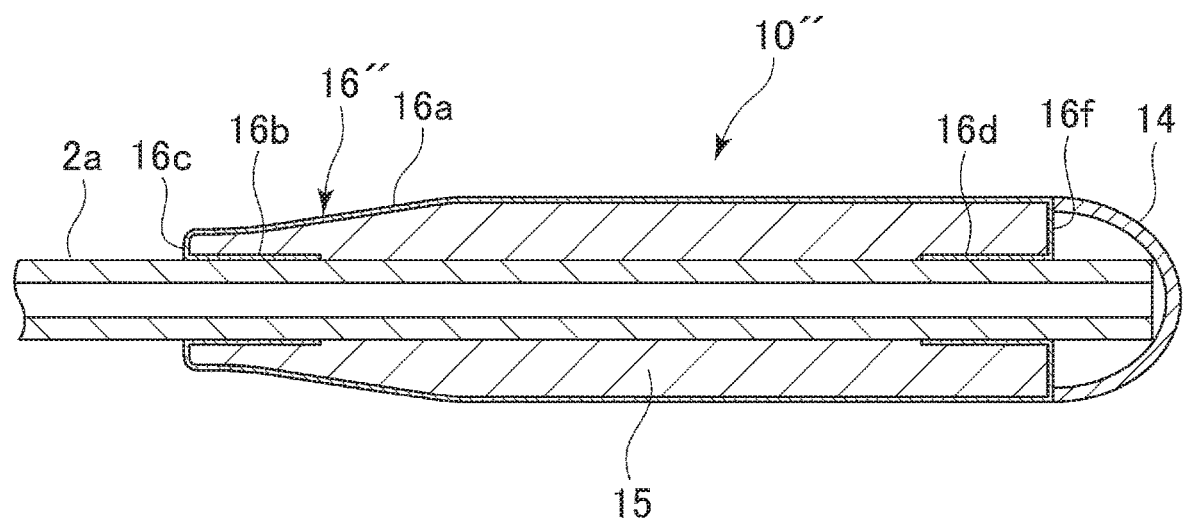
FIG. 5 is a sectional view of a grip according to an embodiment of the present invention.

The shape and arrangement of the fiber-reinforced resin layer 16 are not limited to those described above. FIGS. 4 and 5 show a grip according to another embodiment of the present invention. For example, as shown in FIG. 4, a grip 10' according to an embodiment of the present invention may include a fiber-reinforced resin layer 16' that contacts with the rod element 2a at the inner end of the connection portion 16c. The fiber-reinforced resin layer 16' may be different from the fiber-reinforced resin layer 16 of FIG. 2 in that it may not include the interposition layer 16b.

Further, as shown in FIG. 5, a grip 10" according to an embodiment of the present invention may include a fiber-reinforced resin layer 16". The fiber-reinforced resin layer 16" may include, in a rear portion thereof, an interposition layer 16d positioned between the core layer 15 and the rod element 2a, and a connection portion 16f that may connect the surface portion 16a and the interposition layer 16d. The grip 10" shown in FIG. 5 may be different from the grip 10 of FIG. 2 in that it may include the interposition layers 16 in both front and rear ends thereof. The grip 10" of FIG. 5 may be less prone to yield when gripped by an angler, as compared to the grip 10 of FIG. 2. In the grip 10" of FIG. 5, the core layer 15 may be covered at the rear end thereof as well as at the front end thereof. This arrangement may further restrain wear and corrosion of the core layer 15.

Figure 6:
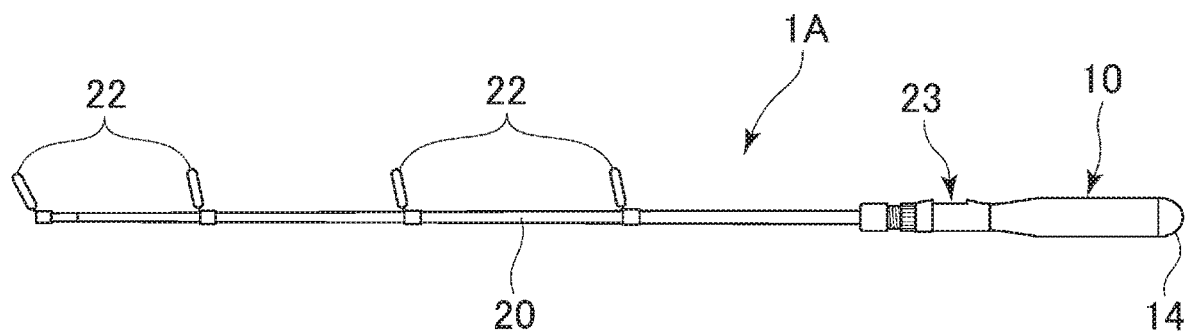
FIG. 6 illustrates a fishing rod according to an embodiment of the present invention.
Figure 7:
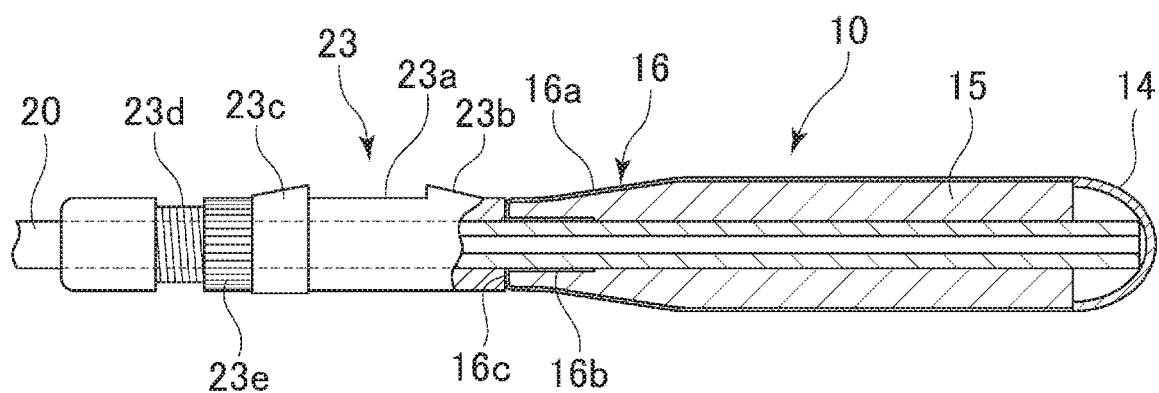
FIG. 7 is a sectional view of a grip provided on the fishing rod of FIG. 6.

FIGS. 6 and 7 illustrate a fishing rod 1A according to another embodiment of the present invention. FIG. 6 shows the entirety of the fishing rod 1A. FIG. 7 is a sectional view of a grip provided on the fishing rod 1A. FIG. 7 is a sectional view showing the grip that is cut along a plane extending through the central axis of a rod element.

The fishing rod 1A of the embodiment may include a rod element 20, a plurality of guides 22 provided on the outer surface of the rod element 20 and configured to guide a fishing line to the rod tip, a reel mounting portion 23, and a grip 10 externally mounted on the rod element 20 at a position more proximal than the reel mounting portion 23. One example of the fishing rod 1A may be a lure rod.

As publicly known, the reel mounting portion 23 may include a placement surface 23a on which a reel leg is to be placed, a fixed hood 23b for fixing the reel leg, and a movable hood 23c opposed to the fixed hood 23b. When an operation member 23e threadably engaged with a screw portion 23d is rotationally operated, the movable hood 23c may be moved toward or away from the fixed hood 23b for attachment and detachment of the reel on the placement surface 23a.

The grip 10 shown in FIG. 7 may have the same configuration as the grip 10 of FIG. 2. It may also be possible that the grip 10 is externally mounted on the rod element 20 at a position more distal than the reel mounting portion 23. The fishing rod 1A shown in FIGS. 6 and 7 may include the grip 10' of FIG. 4 or the grip 10" of FIG. 5 in place of the grip 10.

The dimensions, material, and arrangement of the elements described herein are not limited to those explicitly described for the embodiments. The elements are susceptible of modifications for desired dimensions, materials, and arrangements within the scope of the present invention. The elements other than those explicitly described herein can be added to the described embodiments; and part of the elements described for the embodiments can be omitted.

In the above embodiments, the grip 10, the grip 10', and the grip 10" are provided close to the proximal end of the rod element. However, the position to mount the grip is not limited to those in the examples shown. That is, it may also be possible that the grip according to the present invention is mounted on a position other than the proximal end of the rod element. For example, in the example shown in FIG. 6, the grip 10, the grip 10', and the grip 10" may be mounted in front of the reel mounting portion 23. Further, between the reel mounting portion 23 and the grip 10 provided on the proximal end of the rod element 20, there may be provided an additional grip having the same configuration as the grip 10, the grip 10', or the grip 10". Any other grips having the same configuration as the grip 10, the grip 10', or the grip 10" may be mounted on the fishing rod. The rod element having such grips mounted thereon is also included in the scope of the present invention.

What is claimed is:
1. A grip comprising:
  a core layer mounted on an external surface of a rod element; and
  a fiber-reinforced resin layer covering an outer surface of the core layer,
  wherein the fiber-reinforced resin layer comprises:
    a surface portion that covers the outer surface of the core layer;
    an interposition portion positioned between the core layer and the rod element; and
    a connection portion that connects the surface portion and the interposition layer, wherein the surface portion, the interposition portion, and the connection portion form a single continuous fiber-reinforced resin layer, wherein the interposition portion of the single continuous fiber-reinforced resin layer directly contacts an outer surface of the rod element such that reinforcement fibers in the fiber-reinforced resin layer conduct vibration from the rod element to the fiber-reinforced resin layer covering the outer surface of the core layer via the interposition portion of the single continuous fiber-reinforced resin layer, wherein the surface portion comprises:
   a first portion overlaps the interposition portion; and
   a second portion that does not overlap the interposition portion.

2. The grip of claim 1, wherein a part of the fiber-reinforced resin layer covers a front end or a rear end of the core layer.

3. The grip of claim 1, wherein the fiber-reinforced resin layer includes the reinforcement fibers arranged along an axial direction of the rod element.

4. The grip of claim 1, wherein the fiber-reinforced resin layer has a smaller damping ratio than a damping ratio of the core layer.

5. The grip of claim 1, wherein the core layer is made of a resin foam or a natural cork.

6. The grip of claim 1, further comprising an intermediate layer made of a resin and provided between the core layer and the fiber-reinforced resin layer.

7. A fishing rod having the grip of claim 1.

8. The fishing rod of claim 7, wherein a part of the fiber-reinforced resin layer covers a front end or a rear end of the core layer.

9. The fishing rod of claim 7, wherein the fiber-reinforced resin layer includes the reinforcement fibers arranged along an axial direction of the rod element.

10. The fishing rod of claim 7, wherein the fiber-reinforced resin layer has a smaller damping ratio than a damping ratio of the core layer.

11. The fishing rod of claim 7, wherein the core layer is made of a resin foam or a natural cork.

12. The fishing rod of claim 7, further comprising an intermediate layer made of a resin and provided between the core layer and the fiber-reinforced resin layer.

\* \* \* \* \*

UNITED STATES PATENT AND TRADEMARK OFFICE
CERTIFICATE OF CORRECTION

| | | |
|---|---|---|
| PATENT NO. | : 11,606,943 B2 | Page 1 of 1 |
| APPLICATION NO. | : 15/439000 | |
| DATED | : March 21, 2023 | |
| INVENTOR(S) | : Kawamura | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 251 days.

Signed and Sealed this
Seventh Day of January, 2025

Derrick Brent
*Acting Director of the United States Patent and Trademark Office*